Sept. 3, 1957   F. L. OPPENHEIMER ET AL   2,804,938
APPARATUS FOR FILTERING
Filed March 30, 1955
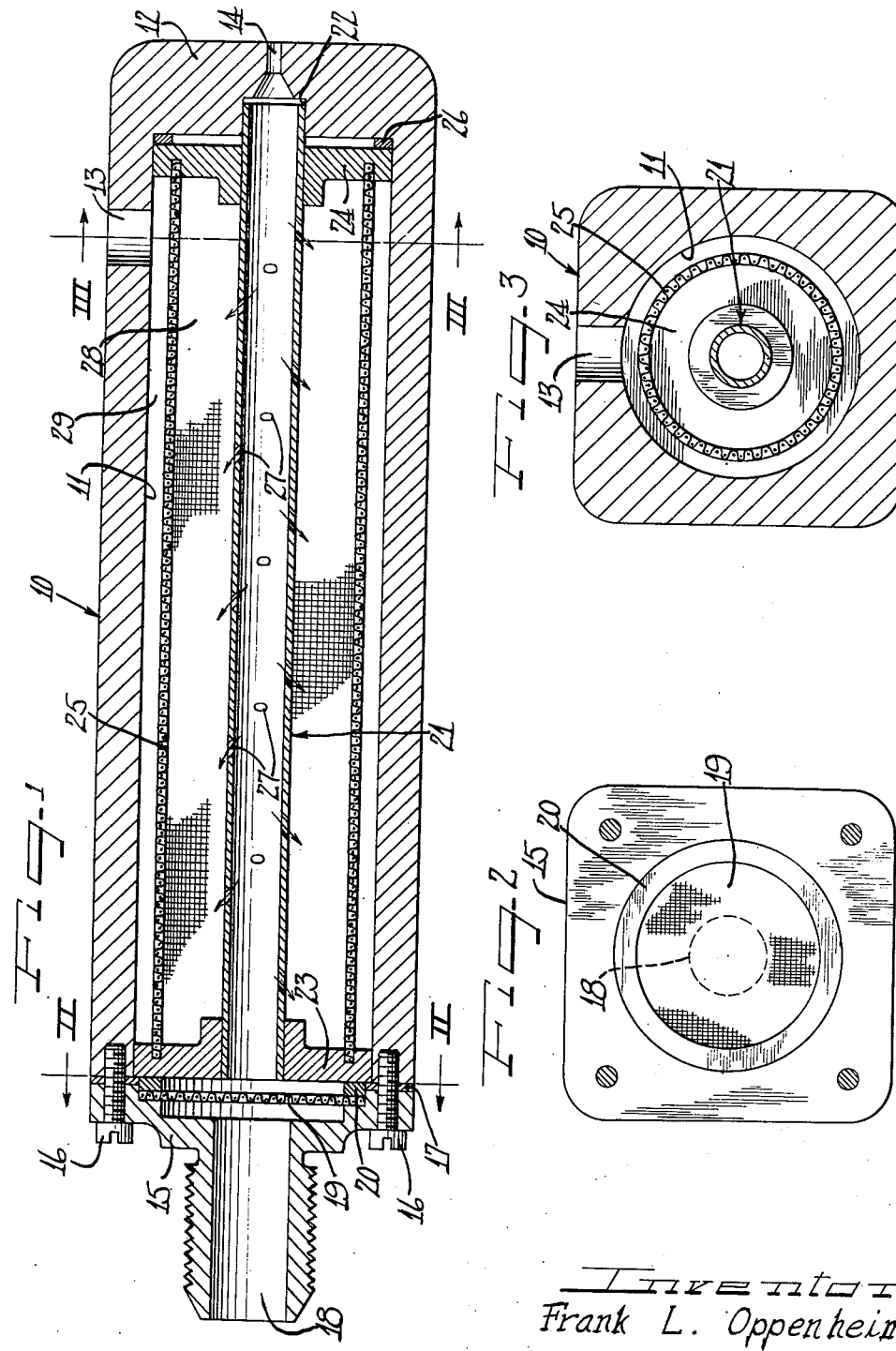
Inventors
Frank L. Oppenheimer
Donald R. Frenk United States Patent Office 2,804,938
Patented Sept. 3, 1957

2,804,938
APPARATUS FOR FILTERING

Frank L. Oppenheimer, Shaker Heights, and Donald R. Frenk, Euclid, Ohio, assignors to Thompson Products, Inc., Cleveland, Ohio, a corporation of Ohio Application March 30, 1955, Serial No. 497,842

4 Claims. (Cl. 183—70)

This invention relates to apparatus for filtering fluids, especially gaseous fluids such as gas, vapor or the like and more particularly to a device for removing dirt and/or other solid particles from an air stream.

The invention is particularly useful in systems having a high mass flow of air capable of retaining contaminants in suspension and operates on the principles of Newton's first and second laws of motion to move the particles with the air in a straight stream and to thereby induce in the heavier contaminants a greater inertia than in the lighter air and to then unbalance the force of the stream at intervals along its length causing the lighter air to accelerate and flow from the stream in the direction of the unbalanced force while the heavier contaminants continue in the main stream.

In general, the invention comprises a dirt tube having a large inlet, a small outlet and a plurality of holes or slots in the side wall thereof between the inlet and outlet. The contaminated fluid enters the inlet at a high enough velocity to maintain the contaminants in suspension. The contaminants in the fluid stream will have a higher inertia than the main fluid since they are denser than the main fluid. The main fluid will be partially diverted through the side wall slots, while the solid particles continue through the tube to be discharged through the restricted outlet. The pressure drop in the tube is controlled by the outlet and by the back pressure of the diverted fluid so that it will never be sufficient to reduce the velocity of the stream in the tube enough to permit drop out of contaminants.

Heretofore, various filtering arrangements have been developed for the purpose of removing particles from a contaminated air stream. These arrangements have generally included one or more screens to filter out the solid particles, but it is well known that after a certain amount of usage, the screens become plugged or clogged, thereby rendering them completely inefficient and even useless. In such installations, it is obvious that maintenance problems are many and expensive. Moreover, due to the eventual plugging or clogging of these filter screens, the capacity of these arrangements has been decidedly limited.

Accordingly, it is an object of this invention to obviate the above named difficulties, and provide an apparatus for separating contaminants from a contaminated fluid stream which operates on the principles of Newton's first and second laws of motion.

A further object of this invention is to provide a means of filtering solid particles from a gas stream in such a way that a major portion of the particle contamination in the system will be exhausted with a portion of the gas so as not to clog or plug the filter screens.

It is another object of this invention to provide a filter for a stream of contaminated gas which ejects contaminant rich gas from one outlet and contaminant freed gas from another outlet to prevent clogging of the elements thereof.

Still a further object of this invention resides in the provision of a filtering apparatus, which requires an extremely low pressure drop for high mass flow of air, thereby not reducing to any excessive amount the required flow of air to a system.

A further object of this invention is to provide a filtering apparatus which will exhaust a major portion of the particle contamination in a system so as not to clog or plug the filter screens, thereby enhancing the capacity of the apparatus.

Still a further object of this invention resides in the provision of a filtering apparatus for removing dirt and/or other solid particles from a particle contaminated air stream of a system which requires little maintenance, and is long lived.

Other objects, features, and advantages of the invention will be apparent from the following detailed disclosure, taken in conjunction with the accompanying sheet of drawing, wherein like reference numerals refer to like parts, in which:

Figure 1 is a longitudinal sectional view, taken substantially through the center of a filtering apparatus accordinging to the invention;

Figure 2 is a sectional view of the filtering apparatus of Fig. 1, taken substantially along line II—II; and Figure 3 is a sectional view of the filtering apparatus of Fig. 1, taken substantially along the line III—III, looking in the direction of the arrows.

Referring generally to Figs. 1–3, the filtering apparatus includes a generally square shaped elongated casing or housing 10, centrally bored as indicated by the numeral 11, and closed at one end by an end wall 12. An exit opening or passageway 13 is provided in one of the side walls of the casing 10 for discharging filtered air from the casing which will communicate with an air flow system, and a resctrictive exhaust aperture or passageway is provided centrally of the end wall 12, as designated by the numeral 14, for exhausting dirt and/or other solid particles from the contaminated air stream.

Closing the open end of the casing 10 opposite the end wall 12 is a head or end wall 15 which is suitably secured to the casing 10 by a plurality of cap screws 16. A gasket or seal 17 of any suitable type is positioned between the casing and end wall 15 to prevent leakage of air at that juncture. Centrally disposed in the end wall 15 is a contaminated air inlet 18, which by virtue of the threaded nipple may be suitably attached to a system or receive a particle contaminated air stream.

As the particle contaminated air stream enters the filtering arrangement, it initially passes through a filter screen 19, which removes any stray large size solid particles from the air stream. The screen 19 is circular in shape and seats on an annular recess within the head or end walls 15, and is held in place by a ring member 20.

The air stream upon passing through the filter 19 enters the mouth of a tube or hollow cylinder, generally designated by the numeral 21, which extends through the full length of the bore 11 with the downstream end being received in a cylindrical recess 22 centrally disposed in the end wall 12 of the casing which communicates through a diverging portion with the diametrically reduced exhaust passageway 14. The mouth of the tube terminates in spaced relation from the screen 19. The tube 21 is concentrically disposed within the bore 11 of the casing 10, and to further maintain this position, a pair of longitudinally spaced, centrally apertured disks 23 and 24 are provided. The disks are sized to be snugly received within the bore 11 and are provided with centrally disposed apertures to snugly receive and engage opposite circumferential portions of the tube 21. A tubular shaped screen 25 concentrically surrounds the tube 21 and is held in position at its opposite ends by the disk members 23 and 24, wherein oppositely disposed annular grooves are provided in the disk members for reception of the ends of the screen 25. It is also noted that the screen 25 aids in maintaining the disks 23 and 24 in spaced relationship within the casing 10. The disk 23 also abuts on one side of the ring member 20, while the disk member 24 may abut on its outside the end wall 12 of the casing 10 or as in the instant case a washer 26.

A plurality of slots or holes 27 are circumferentially and longitudinally disposed in the side wall of the tube 21 in aligned or staggered relationship. The slots 27 are disposed transversely of the flow of the air stream and the longitudinal axis of the tube 21, and have one dimension less than the diameter of the exhaust outlet 14. The slots are preferably spaced apart a distance equal to several times their smaller dimension, viz. diameter or width and must be restricted in number enough to hold the velocity in the tube above the dirt drop out velocity. However, the minimum total hole or slot area should be at least equal to the area of the inlet mouth of the tube. Each slot is also preferably inclined so that a plane extending through the longitudinal axis of each slot forms an obtuse angle with the upstream side of the inner wall of the tube 21. A preferred hole or slot arrangement includes a concentration at the inlet end of the tube with most of the holes or slots in the inlet half of the tube. This is the higher velocity end of the tube. It will also be understood that the diameter of the exhaust passage 14 is slightly larger than the mesh of the screen 19 at the entrance of the tube 21 so that any particle entering the tube will be capable of passing through the exhaust passage 14.

A portion of the air stream entering the mouth of the tube 21 is diverted through an obtuse angle or an angle greater than 90° to pass through the various slots 27 and enter an annular chamber 28. Due to the inertia or momentum of dirt or other solid particles in the air caused by the force exerted by the moving air stream, such particles will tend to continue moving along a relatively straight path, rather than changing direction in their travel to pass through the slots. In other words, the laws of motion apply and the particles will follow a substantially straight path, bouncing off the side of the tube, and will be carried out the end of the tube through the exhaust passage 14. The ratio of contaminated air flow through outlet 14 to pure air flow through 13 is approximately 1 to 2 in a preferred installation, but will depend on the relative outlet orifice sizes and the pressures downstream from these orifices.

The air having passed through the slots 27 of the tube 21 may now be passed through the fine mesh screen filter 25 to insure that any objectionable stray particles not removed by the screen 19 and the tube 21 will be kept from entering the passage system. The air leaving the fine screen filter 25 is then collected in a second concentric annular chamber 29 and directed through the exit passage 13 to be used in the system.

It has been found that the application of this filtering system requires less than 1% pressure drop for high mass flow of air, if the ratio of exit air passage area (outlet 14) to system passage area (outlet 13) is 1-16. Therefore, the required flow of air to the system is not reduced in any extensive amount. This application has been successful where the filtering of contaminated air from 15-200 p. s. i. (gauge) has been involved. Of course the inlet pressure must be above the outlet pressure to maintain flow above the dirt drop out point.

The filter of this invention was specifically developed for use in an air modulating valve where compressor discharge air from a turbo jet engine is modulated to drive a pump. This air may contain carbon and other oil by-products, metal burns, dust etc. A typical use of the filter is to filter servo-control air to pneumatic servo-systems.

Thus, it is seen there is now provided a filtering arrangement capable of removing a major portion of the particle contamination in an air flow system without clogging filter screens, through the application of a tube having slotted side walls, wherein the fact that the inertia of the moving particles of contamination, once having been set in motion in a straight line, is sufficient to keep these particles from bending their path through the obtuse angle required, in order to pass through the slots in a tube, and thereby the particles will be exhausted from the system.

While the invention has been specifically described as embodied in an air filter the principles of the invention are applicable to filters in general for removing contaminants from a fluid stream. This stream could be of any composition including gases, vapors or liquids if the contaminants are sufficiently heavier or denser than the main fluid body to develop enough difference in inertia so that they will not be deflected through the slots.

While a straight dirt tube is preferred, the tube could be curved or angled provided that the outer tube wall at the curved area or bend is imperforate.

It will be understood that modifications and variations may be effected without departing from the scope of the novel concepts of the present invention.

We claim as our invention:

1. In an air purifier for use in an air modulating valve where compressor discharge air from a turbo jet engine is modulated to drive a pump, the combination of an elongated separating housing with a cylindrical inner chamber and a rear end wall embodying a centrally disposed restricted outlet therein, an air inlet at the forward end of said chamber, a circular disk member disposed in the rear end of said chamber, a circular disk member disposed in the forward end of said chamber, each of said disks having a central opening therein, a rigid cylindrical metal tube supported centrally and longitudinally within said chamber by said disks, the ends of said tube being disposed within the openings in said disks and in direct communication with said air inlet and said restricted outlet, a plurality of slots in said tube of such width as to be less than the diameter of said restricted outlet, a mesh screen at the inlet end of said tube of such mesh as to prevent particles from entering the tube which could not pass through said restricted outlet, a fine mesh cylindrical screen concentrically disposed with said tube, said cylindrical screen providing an annular space between it and the side wall of said housing, and a filtered air outlet arranged in the side wall of said housing in communication with the space in said chamber between said cylindrical screen and said side wall.

2. In an air purifier for use in systems having a high mass flow of air, the combination of an elongated housing with a cylindrical inner chamber having a rear end wall integrally formed therewith, said end wall having a restricted outlet located at the center thereof, the forward end of said housing having an end closure secured thereto, said closure having an air inlet disposed at the center thereof, a circular disk arranged in each end of said chamber, each of said disk members embodying a central aperture and an oppositely disposed annular groove, a rigid cylindrical metal tube arranged longitudinally and centrally within said chamber, the ends thereof extending through the apertures in said disk members and having the open ends thereof in direct communication with said air inlet and said restricted outlet, a plurality of slots in said tube of such a width as to be less than the diameter of said restricted outlet, a mesh screen arranged transversely within said chamber in front of the air inlet end of said tube and of such a mesh as to prevent particles from entering the tube which could not pass through said restricted outlet, a fine mesh tubular shaped screen concentrically arranged in said chamber and disposed therein by having the ends thereof positioned in the oppositely disposed annular grooves in said disk members, said cylindrical screen providing an annular space between it and said tube, and an annular space between it and the side wall of said chamber, and a filtered air outlet arranged in the side wall of said housing and in communication with the space between said tubular screen and said side wall whereby the purified air may be discharged from said chamber.

3. In a fluid stream purifier for use in systems having a high mass flow of fluid, a combination of an elongated casing, an inlet for receiving a particle contaminated fluid stream, a restricted outlet for exhausting solid particles, an outlet in said casing for exiting filtered fluid, a rigid cylindrical tube extending within said casing, the mouth end of said tube communicating with said inlet and the other end in communication with said exhausting outlet, said exhausting outlet sized substantially smaller than the mouth of said cylindrical tube, a screen covering the mouth of said cylindrical tube for filtering large sized particles from the stream and having a screen mesh slightly smaller than said exhausting outlet, a fine mesh screen surrounding said cylindrical tube defining on one side with the inner wall of said casing a collecting chamber and on the other side with said tube an annular chamber, said exiting outlet communicating with said collecting chamber, and a plurality of slots along said tube providing intercommunication between said annular chamber and the interior of said tube, each slot being disposed transverse the longitudinal axis of said tube and having a width less than the diameter of the exhausting outlet of said casing.

4. In a device for use to filter servo-control fluids to pneumatic servo-systems and for removing solid particles from a fluid stream which comprises an elongated casing with a cylindrical inner chamber, an inlet for receiving a particle contaminated fluid stream, a restricted outlet for exhausting solid particles, an outlet in said casing for exiting filtered fluid, a circular disk member arranged in each end of said casing, each of said disk members embodying a central aperture and an oppositely disposed annular groove, a rigid cylindrical tube arranged longitudinally and centrally within said casing, the ends of said tube extending through the apertures in said disk members, the mouth end of said cylindrical tube communicating with said inlet and the other end in communication with said exhausting restricted outlet, said exhausting restricted outlet sized substantially smaller than the mouth of said tube, a screen covering the mouth of said tube for filtering large sized particles from the stream and having a screen mesh slightly smaller than said exhausting outlet, a fine mesh tubular screen surrounding said tube defining on one side with the inner wall of said casing a collecting chamber and on the other side with said tube an annular chamber, said screen supported in said casing by having the end thereof positioned in the oppositely disposed annular grooves in said disk members, said exiting outlet communicating with said collecting chamber, and a plurality of slots along with said tube providing intercommunication between said annular chamber and tube, each slot being disposed transverse the longitudinal axis of said tube and having a width less than the diameter of the exhausting outlet of said casing and being tipped so that a plane extending through the longitudinal axis thereof forms an obtuse angle with the inner wall of said tube on the upstream side of each slot, whereby fluid from a particle contaminated fluid stream will be diverted to an obtuse angle when passing through a slot.

References Cited in the file of this patent

UNITED STATES PATENTS

| 764,922 | Davis | July 12, 1904 |
| 2,474,017 | Smith et al. | June 21, 1949 |
| 2,506,273 | Linderoth | May 2, 1950 |
| 2,540,695 | Smith et al. | Feb. 6, 1951 |
| 2,634,821 | Chipley | Apr. 14, 1953 |